United States Patent [19]

Goddard et al.

[11] Patent Number: 5,073,283

[45] Date of Patent: Dec. 17, 1991

[54] ANTIFREEZE COMPOSITION CONCENTRATE CONTAINING OXYALKYLENE COMPOUND AND AN ORGANIC PHOSPHATE SURFACE MODIFIER COMPOUND

[75] Inventors: Errol D. Goddard, Haworth, N.J.; Pak S. Leung, Highland Mills, N.Y.

[73] Assignee: First Brands Corporation, Danbury, Conn.

[21] Appl. No.: 336,530

[22] Filed: Apr. 10, 1989

Related U.S. Application Data

[63] Continuation-in-part of Ser. No. 633,342, Jul. 23, 1984, abandoned.

[51] Int. Cl.$^5$ ............................................. C09K 5/00
[52] U.S. Cl. .................................... 252/78.5; 252/71; 252/73; 252/74; 252/75; 252/100; 422/15; 568/624; 568/625
[58] Field of Search ................ 252/71, 73, 74, 75, 252/100, 78.5; 422/15; 568/624, 625

[56] References Cited

U.S. PATENT DOCUMENTS

| | | | |
|---|---|---|---|
| 2,677,700 | 5/1954 | Jackson et al. | 568/625 |
| 3,282,846 | 11/1966 | Scott | 252/75 |
| 3,337,496 | 8/1967 | Pines et al. | 260/46.5 |
| 3,341,469 | 7/1967 | Pines et al. | 252/389 |
| 3,510,436 | 5/1970 | Silverstein et al. | 422/15 |
| 4,210,549 | 7/1980 | Hirowaza et al. | 252/75 |
| 4,260,504 | 4/1981 | Tucoulat et al. | 252/73 |
| 4,360,474 | 11/1982 | Brady et al. | 260/429.5 |
| 4,465,516 | 8/1984 | Danner et al. | 422/15 |
| 4,684,475 | 8/1987 | Matulewicz | 252/78.5 |

FOREIGN PATENT DOCUMENTS

| | | |
|---|---|---|
| 2530 | 6/1979 | European Pat. Off. |
| 2756747 | 6/1979 | Fed. Rep. of Germany |

*Primary Examiner*—Paul Lieberman
*Assistant Examiner*—Bradley A. Swope
*Attorney, Agent, or Firm*—Gary L. Warner

[57] ABSTRACT

Antifreeze composition and composition concentrates are disclosed which comprise an alcohol, such as, for example ethylene glycol, a surface modifier, such as, for example, an organophosphate which adheres to the interior surfaces of a cooling system, and a pseudo oil, such as, for example a polypropylene glycol, which forms a film on the surface-modified, interior surfaces of the cooling system. Also disclosed are methods of making and using the composition and composition concentrates.

2 Claims, No Drawings

ANTIFREEZE COMPOSITION CONCENTRATE CONTAINING OXYALKYLENE COMPOUND AND AN ORGANIC PHOSPHATE SURFACE MODIFIER COMPOUND

This is a continuation-in-part of application Ser. No. 633,342, filed July 23, 1984, now abandoned.

CROSS-REFERENCE TO RELATED APPLICATIONS

This application is related to the subject matter of co-pending U.S. application Ser. No. 680,756, filed on Dec. 12, 1984 and to co-pending U.S. application Ser. No. D142682 which is a continuation-in-part application of U.S. application Ser. No. 680,756, filed on Dec. 12, 1984, which, in turn, is a continuation-in-part application of U.S. application Ser. No. 633,445, filed on July 23, 1984.

FIELD OF THE INVENTION

The present invention relates generally to heat transfer fluids and, more specifically, to an antifreeze concentrate characterized by superior stability.

BACKGROUND OF THE INVENTION

Conventional alcohol-based heat transfer fluids, such as automobile antifreezes, have the tendency to corrode the various metal surfaces of the heat transfer or cooling system. A variety of metal surfaces are often involved including, for example, aluminum, copper, iron, brass, and solder. Aluminum corrosion can cause special problems.

In automobile coolant systems, any aluminum corrosion that occurs can not only damage the aluminum metal surface being attacked by corrosion, but may also adversely affect other parts of the coolant system due to a phenomenon called "transport deposition". By virtue of transport deposition, soluble aluminum corrosion products formed at engine surfaces may be carried to, and precipitated on, the cooler radiator tubes, where they form heat-insulating fins or coatings that impair heat transfer.

The general problems involved have been addressed by the industry over the years. The system involved is considered to be extremely complex. The innumerable solutions that have been proposed over the years dramatically underscore the complexities involved.

In addition to providing various approaches to solving the problems involved, the numerous prior patents and publications in this field reflect proposals for a seemingly endless list of organic and inorganic compounds as potential corrosion inhibitors. Thus, for example, various inorganic phosphates, silicates, phosphonates, borates, azoles, siliconates, nitrates, nitrites, and the like have been proposed in a wide variety of compositions.

What is considered to be the state-of-the-art technology is based upon what has been termed "silicone-silicate" chemistry. This emanates from the technology disclosed in U.S. Pat. Nos. 3,337,496 and 3,341,469. Numerous variations utilizing this basic technology have been utilized over the years.

This type of system has generally been perceived to have proven exceedingly effective over the years, providing a highly desirable antifreeze composition. However, there are several factors which have created a need for a new type of system.

First of all, the underlying chemistry in this type of system is extremely complex, and is not that well understood or fully under control. Such systems, when not fully under control, can allow polymerization of the silicate leading to the formation of gels in the cooling system. This formation of gels depletes active silicate from the antifreeze, thereby decreasing corrosion protection of the cooling system metal surfaces. Furthermore, modifications to such vehicular cooling systems are being required, fostered by the changing metallurgy in favor of substantially increasing usage of aluminum for various parts of the cooling system. However, these systems often also include conventional ferrous components; and therefore, the inhibitor must provide adequate protection against all types of cooling system metals.

In addition, many automobiles are being manufactured with smaller, harder working engines having higher operating engine temperatures than was the case in the past. Since metal corrosion activity increases at higher engine temperatures, the need for greater protection against corrosion also increases under these more severe operating conditions.

All of these factors have created the desire in some segments of the industry to utilize an antifreeze based on more effective corrosion-inhibitor systems. There is a continuing need for antifreezes and antifreeze concentrates that are physically stable prior to use, thereby facilitating ease of handling and not requiring special mixing by the customer or user, yet which provide adequate corrosion protection for the metallurgy being employed in fabricating vehicular cooling systems.

Certain organophosphate esters have been disclosed for use as lubricants and corrosion inhibitors. For example, ethylene oxide-containing organophosphates and propylene oxide-containing organophosphates and a method of preparing them are disclosed in U.S. Pat. No. 4,360,474.

As an additional illustration, German patent application 2,756,747 discloses PO/EO and PO/BO-containing phosphate esters (wherein "EO" denotes ethylene oxide, "EO" denotes propylene oxide, and "BO" denotes butylene oxide) useful as lubricants and corrosion inhibitors. The compounds of this publication are made by reacting polyphosphoric acid with aliphatic diols, triols, or tetrols. The organophosphates of the German application have molecular weights between 200 and 8,000. This German application is primarily directed to low-foaming metalworking lubricating fluids and does not disclose antifreeze formulations.

European patent application publication No. 59,461 relates to hydraulic fluids containing polyoxyethylene phosphate esters and salts thereof together with a nonionic oxyalkylene block copolymer, said copolymer having a molecular weight from about 950 to about 3,500 and having a polyoxypropylene content of 65 to 100 wt. percent based on the weight of the copolymer.

OBJECT OF THE INVENTION

It is an object of the present invention to provide an antifreeze and an antifreeze concentrate that are physically stable prior to use.

A further object of this invention provides a stable, clear antifreeze that does not necessarily require the use of silicone-silicate constituents.

Yet another and more specific object is to provide an antifreeze having satisfactory protection against aluminum corrosion.

These and other objects will become apparent from a reading of the following detailed specification.

SUMMARY OF THE INVENTION

In one aspect, the present invention relates to an antifreeze composition concentrate for vehicular cooling systems having internal metal surfaces comprising:
(a) alcohol,
(b) at least one oxyalkylene compound of the formula:

$$R'O(X)_nR''$$

wherein R' and R" are hydrogen or an organic radical having 1 to 24 carbons, and where n is an integer between 1 and 100, wherein X is an alkyleneoxy radical or mixture of alkyleneoxy radicals made from the corresponding monomer or co-monomer and having from two to six carbon atoms, with the proviso that when said oxyalkylene compound has an EO content of less than 50 wt. percent of X, the molecular weight of said compound must be less than 900, and
(c) at least one compound selected from the group consisting of organic derivatives of the following: phosphate, sulfate, phosphonate, sulfonate, carboxylate, organoammonium and phosphonium salts, amine oxides, phosphine oxides, amphoteric and zwitterionic groups such as betaines and sulfobetaines and mixtures thereof; wherein the organic group is selected from the class consisting of the following radicals: alkyl, alkenyl, alkynyl, aryl, alkylaryl, arylalkyl, alkyleneoxy, polyalkyleneoxy, and combinations thereof, present in an amount sufficient to provide surface modification of the metal surfaces and to allow said oxyalkylene compound to form a film on the surface-modified metal surfaces.

In another aspect, the present invention relates to the antifreeze composition produced by diluting the above concentrate with water and/or alcohol.

In still another aspect, the present invention relates to a method of making the above antifreeze composition and composition concentrate.

DETAILED DESCRIPTION OF THE INVENTION

Considering first component (c), the useful compounds may be termed "surface modifiers". In general, the function of such compound is to attach or anchor itself to the metal surface and to provide an affinity with the oxyalkylene compound so that a uniform film of the oxyalkylene compound on the surface-modified metal surfaces will be provided. For sake of discussion herein, the oxyalkylene compound will be sometimes referred to herein as a "pseudo oil". The thus-provided pseudo oil film will serve to protect the coated metal surfaces against corrosion.

One end of the surface modifier molecule must have the capability of attaching or anchoring the compound to the metal surfaces in the automotive cooling system. To provide long-term effectiveness, the moiety selected should possess thermal, hydrolytic and chemical stability in the cooling system environment, viz.—should not be easily stripped from the metal surface.

The other end of the surface modifier molecule serves to provide affinity between the pseudo oil and the coated metal surface to provide the requisite oil film that imparts the corrosion inhibition characteristic of the antifreeze composition concentrates of this invention. This end of the surface modifier molecule, typically an organic moiety, should have the capability of being preferentially "wetted" by the pseudo oil rather than by the continuous alcohol-water system of the working antifreeze composition. If this were not the case, formation of the desired uniform pseudo oil film would be impaired. The adequacy of the surface modifier in this respect can thus be readily determined by conventional wetting angle measurements and various corrosion measurement techniques.

The preferred surface modifier compounds are the organophosphates. The preferred organophosphates useful in the present invention are those made by reacting phosphoric acids with aliphatic mono-ols, diols, triols or tetrols containing PO/EO, PO/BO or PO/BO/EO with a PO content of at least 50 wt. % based on the weight of the PO+BO+EO in the alcohol reactant. Their mode of synthesis is well-known and is described by L. W. Burnette in *Nonionic Surfactants*, vol 1, p 372-394 (Marcel Derker, Inc. 1966). As used herein, the term organophosphate is intended to designate any ester of phosphoric or polyphosphoric acid.

Generally, the organophosphates useful in the present invention are identified by the structural formula:

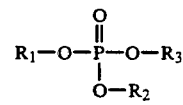

wherein each substituent $R_1, R_2, R_3$ is selected from the class consisting of the following radicals: hydrogen; alkyl, aryl, alkenyl and alkynyl, with each of the foregoing having up to about 24 carbon atoms; alkyleneoxy, polyalkyleneoxy; phosphate, polyphosphate and their salts, and combinations thereof; with the proviso that at least one of said substituents is an organic radical listed above or combinations thereof.

The preferred organophosphates have the structural formula identified above wherein at least one R substituent consists of an organic radical containing an alkylene oxide polymer or copolymer $R_4O(PO)_x(EO)_y(BO)_z$—, wherein the alkyleneoxide units may be either random or blocked where $x > y > z$ and $x+y+z \leq$ about 100, and $R_4$ is selected from the class of radicals: hydrogen; alkyl, aryl, alkenyl and alkynl with the foregoing having up to about 24 carbon atoms; phosphates, polyphosphates and salts thereof, and combinations of the above. These organophosphates preferably have molecular weights below about 10,000 to insure solubility in the antifreeze composition.

Preferred organophosphates are identified by structural formulae I to III, and the free acids and salts thereof, together with mixtures thereof:

 (I)

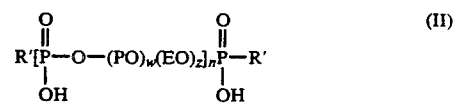 (II)

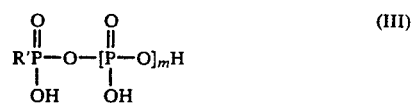 (III)

wherein

R'=[RO(PO)$_x$(EO)$_y$] where R=H or alkyl, aryl, alkylaryl or arylalkyl having up to 24 carbon atoms
PO=Propylene oxide radical
EO=Ethylene oxide radical
x=1 to 100
y=0 to 50
k=1 to 3, with the provisio that when k=3, at least one R' group is removed from the phosphate ester by hydrolysis prior to or during use
n=1 to 100
w=0 to 100, with the proviso that if w ≧ 1, than x can be zero
z=0 to 50
m=1 to 10

Within a given formula where x, y, w or z values appear more than once, the values may be the same or different numbers.

Typical useful classes of organophosphates falling within the groups identified by structural formulae I through III above, are identified as follows:

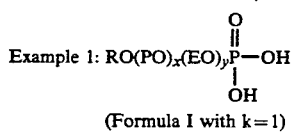

Example 1: RO(PO)$_x$(EO)$_y$P—OH with OH (Formula I with k=1)

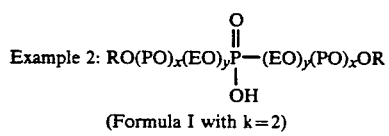

Example 2: RO(PO)$_x$(EO)$_y$P—(EO)$_y$(PO)$_x$OR with OH (Formula I with k=2)

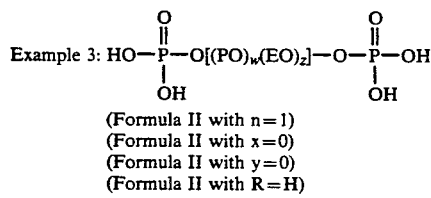

Example 3: HO—P—O[(PO)$_w$(EO)$_z$]—O—P—OH with OH, OH (Formula II with n=1)
(Formula II with x=0)
(Formula II with y=0)
(Formula II with R=H)

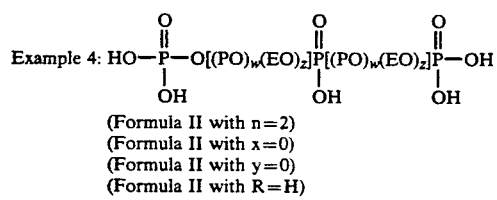

Example 4: HO—P—O[(PO)$_w$(EO)$_z$]P[(PO)$_w$(EO)$_z$]P—OH with OH, OH, OH (Formula II with n=2)
(Formula II with x=0)
(Formula II with y=0)
(Formula II with R=H)

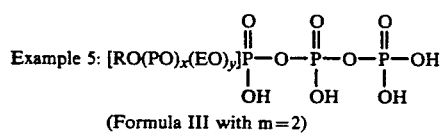

Example 5: [RO(PO)$_x$(EO)$_y$]P—O—P—O—P—OH with OH, OH, OH (Formula III with m=2)

Functionally, the amount of the surface modifier employed should be sufficient to provide surface modification of the interior surfaces of the cooling system, viz.—in the working antifreeze, at least a mono-molecular coating of surface modifier on the cooling system metal surfaces is provided, which, in turn allows a pseudo oil film to be formed thereon. The amount required can be readily determined based on the surface area of the cooling system to be protected. The specific amount can vary over a wide range, but is preferably used in an amount of between 0.001 and about 30 weight percent, more preferably between about 0.005 and about 1, most preferably between about 0.005 and about 0.1, based on the weight of the concentrate. Below the 0.001 weight percent, the amount of organophosphate is expected to be insufficient to be effective, whereas above about 30 percent organophosphate is expected to provide no significant further corrosion inhibition benefits.

Other less preferred surface modifiers are organic derivatives of: a sulfonate, such as barium alkyl benzene sulfonate; a phosponate, such as dodecyl phosphonate; a carboxylate, such as a carboxylic acid grafted on polyalkylene glycol; an organoammonium salts, such as cetyltrimethylammonium chloride, as well as the other hydrophobizers described above, should be present in the broad range of amounts described above for the organophosphates.

Many of the surface modifier compounds employed, such as the organophosphates, will provide protection against corrosion of the metal surfaces in and of themselves. When such compounds are employed, the corrosion protection provided by such compounds together with the pseudo oil film combine to provide superior corrosion resistance.

The oxyalkylene compound or "pseudo oil" useful in the antifreeze concentrates and compositions of the present invention preferably provides a cloud point for the antifreeze between about 40° C. and about 125° C., more preferably between about 65° C. and about 125° C., most preferably between about 65° C. and about 90° C. This temperature range encompasses the normal operating temperature of vehicular coolants. This cloud point range insures that the antifreeze is visually single-phase when the car's engine is not in operation. Presence of the cloud point makes the antifreeze "consolute", referring to the tendency of the pseudo oil to come out of solution and coat the coolant system metal surfaces at or above the cloud point temperature.

The preference for utilizing a consolute antifreeze is predicated upon the improved corrosion resistance provided. More particularly, the pseudo oil that comes out of solution is believed to have greater affinity for the surface-modified metal surfaces of the cooling system than does the pseudo oil in solution. However, while less than optimum, the use of nonconsolute antifreeze systems will likewise provide improvement in corrosion resistance.

Whether the antifreeze is consolute or non-consolute, the pseudo oil employed must be soluble at ambient temperature in the alcohol selected as the antifreeze base. The preferred oxyalkylene compounds have a molecular weight of less than about 900 when the EO content of the oxyalkylene portion of the compound is less than about 50 wt. percent. Above a molecular weight of about 900 for oxyalkylene compounds having an EO content less than about 50 wt. percent, these compounds are generally insoluble in aqueous alcohol solutions at room temperature and, hence, not useful as pseudo oils in antifreeze. When the EO content in the oxyalkylene portion of the compounds is more than about 50 wt. percent, the compound is expected to be soluble at room temperature at all molecular weights in alcohol and useful in antifreeze. The most preferred oxyalkylene compound is polypropylene glycol.

In general, the amount of the pseudo oil utilized should be sufficient to provide the desired oil film. Suitable amounts, which will vary over a wide range, can be empirically determined based upon the interior surface area dimensions of the metals to be protected in the automobile cooling system. In order to provide the desired oil film based upon various cooling system sizes, the pseudo oil may accordingly be employed in an amount between about 0.01 and about 5 weight percent, preferably between about 0.1 and 3 weight percent based on the total weight of the concentrate. Below 0.01 weight percent, the oxyalkylene compound would not be expected to be functional, whereas about 5 weight percent, the amount would be too costly.

The alcohol employed in the composition of this invention preferably is at least one alcohol selected from the group consisting of methanol, ethanol, propanol, ethylene glycol, diethylene glycol, triethylene glycol, propylene glycol, and dipropylene glycol. However, other alcohols can be used such as, for example, butylene glycol, the monoacetate of glycero, the dimethylether of glycerol alkoxyalkanols (such as methoxyethanol), and hydroxy and alkoxy end-blocked polyalkylene oxides. The preferred alcohol is ethylene glycol.

As is apparent from the discussion herein, the selection of the pseudo oil should be coordinated with that of the surface modifier. More specifically, to provide adequate corrosion resistance, the pseudo oil selected should preferentially wet the surface-modified metal surface and essentially displace the alcohol-water medium of the working antifreeze on the surface-modified metal surface.

A buffer or mixture of buffers is optionally employed in the antifreeze concentrates and compositions of the present invention. The buffer can be employed in a wide range of amounts, but is preferably used in an amount of between about 0.1 and about 5 wt. percent based on the weight of the concentrate.

The borate buffer useful in the composition concentrate of the present invention is conveniently added as the sodium tetraborate pentahydrate salt, which is commercially available. After adding the salt, addition of sodium hydroxide can be used to provide the desired mixture of metaborates and tetraborates in the concentrate.

Other compounds useful as buffers in the composition concentrate of the present invention include: phosphates, such as alkali metal phosphates; benzoates and substituted benzoates, such as alkali metal hydroxybenzoate; and, salts of dibasic acids having 6 to 12 carbons, such as sodium sebacate.

Among other functions, the buffer serves to provide the desired pH and reserve alkalinity (RA) during use. Preferably, the concentrate will have a pH of between about 5.5 and about 11 to provide a diluted antifreeze pH of between about 8 and about 11.

It should, of course, be appreciated that the working pH selected may affect the adherency of the surface modifier coating on the metal surfaces. The efficacy of the particular working pH in this regard may be readily ascertained.

Optional additives may be employed in minor amounts of less than 50 wt. percent based on the weight of the concentrate. Typical optional additives would include, for example, known corrosion inhibitors for metals such as, for example, molybdates, phosphates, benzoates, sebacates, carbonates, silicone/silicates, hydroxybenzoates or acids thereof, alkali metal nitrates, alkali metal nitrites, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the aluminum or other metal surfaces to be protected. Other typical optional additives that may be used include wetting agents and surfactants such as, for example, known ionic and non-ionic surfactants such as the poly(oxyalkylene) adducts of fatty alcohols; antifoams and/or lubricants such as the well-known polysiloxanes and the oxyalkylene glycols. Indeed, any other minor ingredient known in the art that does not adversely affect the corrosion resistance sought to be achieved may be employed.

If desired, the antifreeze concentrate of this invention may be utilized in combination with other antifreeze concentrates. For example, the antifreeze concentrates of the present invention may be utilized with state-of-the-art antifreeze compositions. U.S. Pat. No. 3,337,496 is representative of this type of technology.

However, the antifreeze concentrates of this invention, particularly of the consolute type, should afford adequate corrosion resistance in and of themselves. The stability and simplicity of the antifreeze concentrates of the present invention should likewise offer processing and handling advantages in comparison to state-of-the-art antifreeze concentrates.

The following Examples are merely illustrative of, and not intended to limit the present invention.

EXAMPLE 1

A. Preparation of surface modifier plus pseudo oil antifreeze

This Example illustrates the preparation of several antifreeze concentrates of this invention utilizing various pseudo oils and surface modifiers and tests the effectiveness with respect to heat rejecting aluminum surfaces.

A base fluid, having the composition set forth in Table I, was prepared.

TABLE I

| BASE FLUID COMPOSITION | |
|---|---|
| COMPONENT | WT. % |
| ethylene glycol | 98.26 |
| sodium tetraborate pentahydrate | 1.47 |
| sodium hydroxide (50% aq.) | 0.27 |
| Total wt % | 100.00 |

To the base fluid was added surface modifier and pseudo oil of the type and amount specified in Table II (set forth hereinafter), followed by brief stirring to insure that the ingredients were thoroughly mixed.

The above concentrate was diluted to make a working antifreeze solution by mixing 33 wt. % of concentrate with 67 wt. % of "corrosive water" (deionized water containing 100 ppm. each of $SO_4^=$, $HCO_3^-$ and $Cl^-$, all added as the Na salts). The antifreeze solution was clear and bright in appearance.

B. Laboratory Disc Heat Flux Test: Method, Apparatus and Results

A test method used in the industry was employed to determine the corrosion inhibitory effect of the formulated composition of the present invention with respect to heat rejecting aluminum surfaces. This test method is described in *Corrosion*, 15, 257t at 258t (1959) "Laboratory Methods for Determining Corrosion Rates Under Heat Flux Conditions" and also in an ASTM publishion entitled, "Engine Coolant Testing: State of the Art," a symposium sponsored by ASTM Committee D-15, and pages 17-19 (Printed, May 1980), both incorporated herein by reference.

The following summarizes the test equipment and procedure used:

The apparatus consists of a 1 liter flask, fitted with a condenser, a thermometer, a cold finger, a temperature controller, a 1½ inch diameter×¼ inch thick No. 319 aluminum casting alloy (herein "the aluminum disc"), and a soldering iron heat source.

The apparatus was charged with 900 ml. of the above-diluted test solution and heated to effect boiling at the aluminum disc surface and to maintain a solution temperature of about 80° C. The test duration was 168 hours. The weight loss of aluminum from the aluminum disc was determined and used as a measure of corrosion inhibitor effectiveness.

The results are set forth in Table II:

TABLE II

| | Mg. Wt. Loss - Aluminum Disk Test | | | | |
|---|---|---|---|---|---|
| | | SURFACE MODIFIER | | | |
| Additive | (Control) None | 0.005% PV4[1] | 0.01% PV4[1] | 0.1% LE500[2] | 0.1% BASF 7622[3] |
| Pseudo Oil | | | | | |
| None | 60 | 49 | 28 | 34 | 42 |
| 0.5% Consolute PPG725[4] | 29 | 0 | 0 | 3 | 7 |
| 1% PPG 425[5] | 21 | 14 | 0 | 37 | 22 |
| 1% LB65[6] | 64 | — | 50 | — | — |
| 1% 50HB660[7] | 32 | 32 | — | 26 | — |
| 1% CARBOWAX 1000[8] | 45 | 2 | — | 32 | 25 |
| 1% CARBOWAX 200[9] | 64 | 25 | 4 | — | — |
| 1% PROPASOL DM[10] | 62 | 0 | 0 | 32 | 20 |
| 1% PROPASOL LM[11] | 47 | 1 | — | — | — |
| 1% PROPYLENE GLYCOL[12] | 69 | 63 | — | 39 | — |
| 1% TERGITOL NP27[13] | 66 | 15 | 26 | 44 | — |

FOOTNOTES TO TABLE II
[1]CYCLOPHOS PV-4, a propylene oxide/ethylene oxide based phosphate ester having a PO content of greater than 50% and having a specific gravity of 1.08 at 25° C., a product of Cyclo Chemicals, Inc. (hereinafter referred to as "PV-4").
[2]ANTARA LE500, a polyethyleneoxy-based phosphate ester with aromatic hydrophobe, having a specific gravity of 1.11 at 25°, a product of GAF Corp.
[3]BASF 7622, an experimental bis-phosphate ester of propylene oxide/ethylene oxide based block copolymer, high in propylene oxide content, a product of BASF Wyandotte Corporation.
[4]POLYPROPYLENE GLYCOL having a molecular weight of 725.
[5]POLYPROPYLENE GLYCOL having a molecular weight of 425.
[6]UCON LB65 is a butanol-started polypropylene glycol having a molecular weight of 300, a product of Union Carbide Corporation.
[7]UCON 50HB660 is a propylene oxide/ethylene oxide copolymer having 50 wt. percent ethylene oxide based on the total of ethylene oxide plus propylene oxide and having a molecular weight of 1700, product of Union Carbide Corporation.
[8]CARBOWAX 1000 is a polyethylene glycol product of Union Carbide having a molecular weight of 1000.
[9]CARBOWAX 200 is a polyethylene glycol product of Union Carbide, having a molecular weight of 200.
[10]PROPASOL DM is a monomethylether of dipropylene glycol product of Union Carbide, having a molecular weight of 148.
[11]PROPASOL LM is a monomethylether of propylene glycol, a product Union Carbide, having a molecular weight of 90.
[12]PROPYLENE GLYCOL having a molecular weight of 76.
[13]TERGITOL NP27 is a nonionic surfactant of Union Carbide comprising a nonylphenol ethoxylate having an average of 7 ethylene oxide units per molecule, having a molecular weight of 512.

The results as presented in Table II above, generally show each pseudo oil to have some aluminum corrosion inhibition effectiveness as compared to at least one control composition. The results likewise provide guidance for the selection of the more useful combinations of pseudo oil and surface modifier within the broad scope of the present invention.

In one aspect, the results as presented in Table II above show the effectiveness of a consolute pseudo oil (PPG 725)-containing antifreeze in combination with various surface modifiers in inhibiting aluminum corrosion on the disk test. Note that a combination of 0.5 weight percent PPG 725 and 0.005 weight percent PV4 produced an aluminum weight loss of zero mg., whereas a control with no PPG 725 and no PV4 produced a weight loss of 60 mg. Moreover, a comparison test with no pseudo oil and 0.005 weight percent PV4 produced an aluminum weight loss of 49 mg. and a comparison test with 0.5 weight percent PPG 725 and no surface modifier produced a weight loss of 29 mg. Analogous results to those discussed above were also found when PPG 725 was tested in combination with a higher amount (0.01 weight percent) of PV4, LE500 and BASF 7622.

PPG 725 exhibited consolute behavior in admixture with the surface modifier and, since the resulting antifreeze had a cloud point between about 40° C. and about 75° C., the PPG 725 oil was in a separate phase from that of the rest of the composition at the test temperature.

In another aspect, certain non-consolute pseudo oils in combination with certain surface modifiers also provided improved results as compared to the control run with no pseudo oil and no surface modifier, and as compared to the respective single component formulations. For example, PV4 provided results considered to be excellent in combination with the following non-consolute oils: PPG 425, CARBOWAX 1000, CARBOWAX 200, PROPASOL DM, PROPASOL LM and TERGITOL NP27. In contrast, the use of PV4 did not provide any improved results in this disk test when used in combination with the following non-consolute pseudo oils: LB65 and propylene glycol. The reason for the lack of improvement using these two non-consolute pseudo oils is that the LB65 was not soluble in the antifreeze solution, whereas the propylene glycol is speculated to have a molecular weight too low to provide improvement with the surface modifiers tested. It is expected, however, that suitable surface modifiers for these two pseudo oils can be achieved by suitable selection based upon molecular weight and solubility considerations for the pseudo oils.

Likewise, the BASF 7622 surface modifier provided good results in combination with CARBOWAX 1000 and PROPASOL DM and poor results in combination with PPG 425. Another surface modifier, namely LE500, provided poor results in combination with all non-consolute pseudo oils tested.

EXAMPLE 2

This Example shows the effectiveness of other antifreeze concentrates pursuant to the present invention, employing various surface modifiers.

Following the procedure of Example 1 above, additional consolute PPG725 pseudo oil mixtures were made and tested using the aluminum disk test described in Example 1. Four surface modifiers were tested in admixture with PPG725, in the amounts specified in Table III below.

The aluminum disk test results are presented in Table III:

TABLE III

| | Mg. Wt. Loss - Aluminum Disk Test | | | | |
|---|---|---|---|---|---|
| | | SURFACE MODIFIER | | | |
| Additive | (Control) None | 0.1% LB385 Phosphate[a] | 0.1% 25H2000 Phosphate[b] | 0.1% L81 Carboxylate[c] | 0.1% Graft 50HB660[d] |
| Pseudo Oil | | | | | |
| None | 60 | 7 | 21 | 36 | 36 |
| 0.5% Consolute PPG725[e] | 29 | 6 | 15 | 26 | 20 |

FOOTNOTES TO TABLE III

[a] UCON LB385 phosphate, a phosphate ester of Union Carbide's UCON LB385. UCON LB385 is a butanol-started polypropylene glycol having a viscosity of about 600 centipoise at 60° F.

[b] UCON 25H2000 phosphate, a phosphate ester of Union Carbide's UCON 25H2000, an ethylene oxide/propylene oxide copolymer having 25 wt. % ethylene oxide based on the total weight of ethylene oxide plus propylene oxide in the copolymer.

[c] PLURONIC L81 "carboxylic acid", a carboxylic acid derivative of BASF's PLURONIC L81. PLURONIC L81 is a propylene oxide/ethylene oxide based on the total weight of ethylene oxide plus propylene oxide in the copolymer. The molecular weight of the total propylene oxide in the copolymer is 2250.

[d] 10 wt. percent acrylic acid grafted UCON 50HB660 produced in accordance with the method described in U.S. Pat. No. 4,392,972, incorporated herein by reference.

[e] Polypropylene glycol having a molecular weight of 725.

The results as presented in Table III above show that each mixture containing consolute PPG 725 provides a lower mg. weight loss on the disk test than does the corresponding formulation without PPG 725.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

We claim:

1. An antifreeze composition concentrate comprising:
   (a) alcohol
   (b) at least one oxyalkylene compound of the formula:

$$R'O(X)_nR''$$

wherein R' and R'' are hydrogen or an organic radical having 1 to 24 carbons, and where n is an integer between 1 and 100, wherein x is an alkyleneoxy radical or mixture of alkyleneoxy radicals made from the corresponding monomer or co-monomer and having from two to six carbon atoms, with the proviso that when said oxyalkylene compound has an EO content of less than about 50 wt. percent of X, the molecular weight of said compound must be less than about 900,
   (c) at least one surface modifier compound consisting of an organic derivative of phosphate, wherein the organic group is selected from the class consisting of the following radicals: alkyl, aryl, alkylaryl, arylalkyl, alkyleneoxy, polyalkyleneoxy, and present in an amount sufficient to provide improved corrosion resistance by surface modification of the metal surfaces to allow said oxyalkylene compound to form a film on the surface-modified metal surfaces, and
   (d) wherein said antifreeze composition concentrate has a cloud point between about 40° C. and about 125° C. when additionally containing water in an amount to make a diluted working antifreeze.

2. The antifreeze concentrate composition of claim 1 wherein the oxyalkylene compound is polypropylene glycol.

* * * * *